United States Patent Office 3,299,088
Patented Jan. 17, 1967

3,299,088
HALO-SUBSTITUTED PHENOXYMETHYL
OXAZOLIDONES
Carl D. Lunsford, Richmond, Va., assignor to A. H. Robins Company, Inc., Richmond, Va., a corporation of Virginia
No Drawing. Filed June 19, 1959, Ser. No. 821,358
2 Claims. (Cl. 260—307)

The present invention relates to certain halo-substituted phenoxymethyl oxazolidones and is more particularly concerned with such compounds which are useful as interneuronal blocking agents or depressants of central synaptic transmission.

The compounds of the present invention have the general formula:

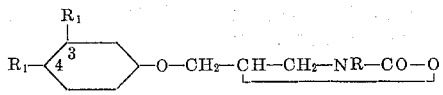

wherein R is hydrogen or a hydrocarbon radical containing up to and including eight carbon atoms and selected from lower-alkyl, cycloalkyl, containing five through seven carbon atoms in the ring, benzyl and phenethyl, wherein $R_1$ is selected from hydrogen and halogen, at least one $R_1$ being halogen. Preferably any lower-alkyl radical contains not more than three carbon atoms and, while the halogen may be iodo, bromo, chloro, or fluoro, the latter three are most suitable and the preferred halogen is chlorine. Compounds wherein the R attached to the three nitrogen of the oxazolidone ring is hydrogen are likewise preferred.

These compounds of the present invention, characterized by the presence of one or more halogen substituents on the phenyl ring, which must be in either or both of the three (meta) and four (para) positions, have been found to have superior activity of the aforementioned type and to be able to block abnormal nervous impulses which give rise to spasm. They show high activity in standard testing procedures. They are especially effective against electroshock-induced convulsions, which activity is indicative of ultimate anticonvulsant, relaxant, tranquilizing and similar clinical use in human beings, e.g., against grand or petit mal epilepsy.

The activity of the compounds of the invention is surprisingly superior to that of the known, and previously most active, 2-mono-substituted phenoxymethyl oxazolidones of an otherwise similar structure, and is correlated with their structural specificity. The fact that they possess superior anticonvulsant activity of one specific type, in a far greater measure than anticonvulsant activity of other types, makes them particularly useful in the instances where specificity of treatment, rather than general anticonvulsant therapy, is indicated or desirable, and makes possible a directed approach, using the compounds of the invention, to specific interneuronal or synaptic target organs or areas. While the compounds do differ among themselves in the magnitude of their respective activities, they are generally characterized by the type and measure of activity indicated in the foregoing.

It is accordingly an object of the present invention to provide certain halo-substituted phenoxymethyl oxazolidones having the foregoing structure and utility, and processes for the production thereof. Other objects will become apparent hereinafter.

In the formulae herein, R may represent, for example, besides hydrogen, the following radicals: lower-alkyl radicals, of both straight and branched-chain nature, such as methyl, ethyl, propyl, isopropyl, n-butyl, sec. butyl, amyl, hexyl, and the like; cycloalkyl such as cyclopentyl, cyclopentylethyl, cyclohexyl, cycloheptyl, ethylcyclopentyl, methylcyclohexyl, cyclohexylmethyl, ethylcyclohexyl, and the like; benzyl and phenethyl; and the like.

The halo-substituted phenoxymethyl oxazolidones of the invention may be prepared in a number of ways. For example, the 5-halophenoxymethyl-2-oxazolidones wherein R in the foregoing formula is hydrogen (and which are therefore unsubstitued at the oxazolidone three nitrogen atom) may be prepared by reacting a selected 3-halophenoxy-1,2-propanediol (having the predetermined substituents on the phenyl ring) and urea, preferably in an approximately 1:2 molar ratio, by heating at an elevated temperature, usually 170° C. to 200° C. and preferably at about 185° C., with or without a solvent. A fusion process is preferably employed. The time required for complete reaction is usually at least three hours and the technique of rapidly heating the reaction mixture to the desired reaction temperature is advantageously followed. On completion of the reaction, the crude oxazolidone may be dissolved in a suitable solvent and recovered therefrom for purification purposes by usual procedure. Alternatively, a selected 3-halophenoxy-1-chloro-2-propanol may be reacted with urea instead of the 3-halophenoxy-1,2-propanediol, using the same molar ratios and under the same reaction conditions.

Moreover, when R is hydrogen, the 5-halophenoxymethyl-2-axazolidones may also be prepared by reacting a selected 3-halophenoxy-2-hydroxy-1-propyl-carbamate and urea, preferably in approximately equimolar quantities, at elevated temperatures, advantageously by heating the reactants together in the temperature range of 170° to 200° C., usually for periods as long as five hours for completion of the reaction, and separating the crude oxazolidone. The pure oxazolidone may be obtained by fractional distillation or by crystallization from an oxygenated solvent. The carbamate starting material may in turn be prepared according to known procedure by reacting the selected 3-halophenoxy-1,2-propanediol with an equimolar quantity of phosgene in the cold in the presence of an organic amine base, such as pyridine or dimethyl aniline, to produce an intermediate chlorocarbonate compound, which is then reacted with ammonium hydroxide to yield the desired starting carbamate.

The substituted 5-halophenoxymethyl-3-hydrocarbon-substituted-2-oxazolidones (wherein R in the formula is a hydrocarbon radical), are conveniently prepared by aminating the selected 3-halophenoxy-1-chloro-2-propanol employing a selected primary amine, such as methylamine, ethylamine, isopropylamine, butylamine, hexylamine, cyclohexylamine, benzylamine, phenethylamine, or the like, according to known procedure, to yield a starting substituted 3-halophenoxy-1-amino-2-propanol having a nitrogen substituent corresponding to that desired in the final 5-halo-phenoxymethyl - 3 - N - substituted-2-oxazolidone. The desired product is prepared by reacting together approximately equimolar quantities of the intermediate N-substituted amino alcohol and a ring closure agent, which may be a dialkyl carbonate, at an elevated temperature, ordinarily about 95–100° C. or thereabout for fifteen minutes to several hours, in the presence of a basic catalyst, such as sodium, potassium, their hydroxides, alkoxides, hydrides, and amides, e.g., sodium ethoxide, potassium hydride, sodium amide, or the like, and preferably in a hydrocarbon solvent. Dialkyl carbonates, particularly di-lower alkyl carbonates, such as dimethyl carbonate, diethyl carbonate, di-n-propyl carbonate, di-n-butyl carbonate, di-sec.-butyl carbonate, and the like, are suitable ring closure agents. Carbonyl chloride may be substituted for the dialkyl carbonate; in such case, a lower temperature, usually below about 35° C., is employed. Starting substituted 3-halophenoxy-1-chloro-3-propanols are in turn prepared in conventional manner by condensing the selected substituted phenol with epichlorohydrin. The final substituted 5-halophenoxymethyl-3-N - substituted-2-oxazolidones may be distilled from the reaction mixture after removal of the hydrocarbon solvent-alcohol azeotrope which forms during the reaction, and recrystallized, or recovered and worked up in other conventional manner.

The following examples are given by way of illustration only, and are not to be construed as limiting.

*Example 1.—5-(p-chlorophenoxymethyl)-2-oxazolidone*

A mixture of 40.5 grams (0.20 mole) of 3-p-chlorophenoxy-1,2-propanediol and 24.0 grams (0.40 mole) of urea was heated at 195–200° C. for five hours and poured into water. The oil was extracted with ethyl acetate, which was dried over sodium sulfate, filtered and concentrated. A crude yield of 25.9 grams (57%) of solid material was obtained, which after several crystallizations from ethyl acetate melted at 143.5–146° C.; M.W. 227.65.

*Analysis.*—Calculated for $C_{10}H_{10}ClNO_3$: N, 6.15. Found: N, 6.14.

This compound was far superior to the corresponding o-chloro compound in standard anticonvulsant tests, and was at least five times as potent in the standard rotarod test.

*Example 2.—5-(p-bromophenoxymethyl)3-ethyl-2-oxazolidone*

To a solution of 44.0 grams (0.16 mole) of 3-p-bromophenoxy-1-ethylamino-2-propanol and 19.0 grams (0.16 mole) of diethyl carbonate in 200 ml. of iso-octane was added 0.1 gram of sodium metal. The mixture was stirred and heated at 95–100° C. for 30 minutes, while the ethanol/iso-octane azeotrope was allowed to distill out. The reaction was practically complete in 15 minutes and the insoluble oxazolidone precipitated from solution. Yield, 48.4 grams (98.2%); melting point, 122.5° C. Recrystallization from iso-octane did not elevate the melting point. M.W. 300.16.

*Analysis.*—Calculated for $C_{12}H_{14}BrNO_3$: C, 48.02; H, 4.70; N, 4.67. Found: C, 48.19; H, 4.89; N, 4.44.

*Example 3.—5-(m-chlorophenoxymethyl)-2-oxazolidone*

A mixture of 40.5 grams (0.20 mole) of 3-m-chlorophenoxy-1,2-propanediol and 24.0 grams (0.40 mole) of urea was heated at 195–200° C. for five hours and poured into water. The oil was extracted with ethyl acetate, dried over sodium sulfate, filtered and concentrated. A crude yield of about 26 grams (57%) of solid material was obtained, which after several crystallizations from ethyl acetate melted at 96.5–97° C.; M.W. 227.65.

*Analysis.*—Calculated for $C_{10}H_{10}ClNO_3$: N, 6.15. Found: N, 6.14.

*Example 4.—5-(p-bromophenoxymethyl)-2-oxazolidone*

A mixture of 0.20 mole of 3-p-bromophenoxy-1,2-propanediol and 24.0 grams (0.40 mole) of urea was heated at 195–200° C. for five hours and poured into water. The oil was extracted with ethyl acetate, dried over sodium sulfate, filtered and concentrated. A crude yield of 20 grams of solid 5-(p-bromophenoxymethyl)-2-oxazolidone was obtained, which after several crystallizations from ethyl acetate melted at 153–154° C.; M.W. 272.11.

*Example 5.—5-(p-chlorophenoxymethyl)-3-ethyl-2-oxazolidone*

To a solution of 0.16 mole of 3-p-chlorophenoxy-1-ethylamino-2-propanol and 18.9 grams (0.16 mole) of diethyl carbonate in 200 ml. of iso-octane is added 0.1 gram of sodium metal. The mixture is stirred and heated at 95–100° C. for 30 minutes, while the ethanol/iso-octane azeotrope is allowed to distill out. The reaction is practically complete in fifteen minutes and the insoluble 5-(p-chlorophenoxymethyl)-3-ethyl-2-oxazolidone precipitates from solution. Yield about 98%; M.W. 116–117° C. Recrystallization from iso-octane does not elevate the melting point. M.W. 255.71. Besides high activity in the loss of righting reflex and anti-electroshock tests, this compound showed high activity against metrazol-induced spasm.

*Example 6.—5-(m-chlorophenoxymethyl)-3-propyl-2-oxazolidone*

To a solution of 0.07 mole of 1-propylamino-3-(m-chlorophenoxy)-2-propanol and 8.3 grams (0.07 mole) of ethyl carbonate in 200 ml. of iso-octane is added 0.1 gram of sodium metal. The mixture is stirred and heated at 95–100° C. for two hours while the ethanol-iso-octane azeotrope is allowed to distill out. At the end of the first hour, an additional 0.1 gram of sodium is added. Upon cooling, an oily layer separates and the iso-octane is decanted therefrom. The residue is recrystallized from dry isopropyl ether. The yield is about 40%. The product is subjected to elemental analysis; carbon, hydrogen, and nitrogen content confirm the structure of the desired product.

*Example 7.—5-(p-chlorophenoxymethyl)-3-hydrocarbon-2-oxazolidones*

In the manner of the preceding Examples 2, 5, and 6, other 3-N-substituted oxazolidones are produced by starting with the appropriate 1-substituted amino-3-(halophenoxy)-2-propanol, which is in turn prepared by reacting the selected primary amine with the 3-(halophenoxy)-1-chloro-2-propanol. In this manner, starting with 1-propylamino, 1-hexylamino, 1-cyclopentylamino, 1-cyclohexylamino, 1-cycloheptylamino, 1-benzylamino, 1-methylbenzylamino, 1-phenethylamino, or 1-methylamino-3-(p-chlorophenoxy)-2-propanol, the 5-(p-chlorophenoxymethyl)-3-propyl-2-oxazolidone, 5 - (p - chlorophenoxymethyl)-3-hexyl - 2 - oxazolidone, 5-(p-chlorophenoxymethyl) - 3-cyclopentyl - 2 - oxazolidone, 5-(p-chlorophenoxymethyl)-3-cyclohexyl-2-oxazolidone, 5-(p-chlorophenoxymethyl)-3-cycloheptyl-2-oxazolidone, 5-(p-chlorophenoxymethyl) - 3 - benzyl-2-oxazolidone, 5 - (p-chlorophenoxymethyl)-3-methylbenzyl-2-oxazolidone, 5-(p-chlorophenoxymethyl)-3-phenethyl-2-oxazolidone, and 5-(p-chlorophenoxymethyl)-3-methyl-2-oxazolidones are prepared, having a 3-nitrogen substituent corresponding to that present in the starting 1-substituted amino-3-(p-chlorophenoxy)-2-propanol.

*Example 8.—5-(m-fluoro and p-fluorophenoxymethyl)-2-oxazolidones*

In the manner of Examples 1, 3, and 4, the compounds 5-(m-fluorophenoxymethyl)-2-oxazolidone and 5-(p-fluorophenoxymethyl)-2-oxazolidone are prepared by reacting 3-(m-fluorophenoxy)-1,2-propanediol and 3-(p-fluorophenoxy)-1,2-propanediol (or the corresponding 1-chloro-2-propanols or 2-hydroxy-1-propyl-carbamates) with urea and separating, working up the product, and purifying it in the usual manner.

*Example 9.—5 - (3,4-dichlorophenoxymethyl)-2-oxazolidone and 5 - (3, 4- dibromophenoxymethyl)-2-oxazolidone*

In the manner of Examples 1, 3, and 4, the compounds 5-(3,4-dichlorophenoxymethyl)-2-oxazolidone and 5-(3, 4-dibromophenoxymethyl)-2-oxazolidone are prepared by reacting 3-(3,4-dichlorophenoxy) 1,2-propanediol or 3-(3,4-dibromophenoxy)-1,2-propanediol (or the corresponding 1-chloro-2-propanols or 2-hydroxy-1-propyl-carbamates) with urea and separating, working up the product, and purifying it in the usual manner.

It is to be understood that the invention is not to be limited to the exact details of operation or exact compounds shown and described as obvious modifications and equivalents will be apparent to one skilled in the art, and the invention is therefore to be limited only by the scope of the appended claims.

I claim:
1. 5-(p-chlorophenoxymethyl)2-oxazolidone.
2. 5-(m-chlorophenoxymethyl)-2-oxazolidone.

References Cited by the Examiner

UNITED STATES PATENTS 2,895,960  7/1959  Lunsford _____ 260—307.3

OTHER REFERENCES

Am. Cyanamid, Australian Abstract, 42986/58, May 7, 1959.

Beasley et al., Chem. Abstracts, vol. 51, col. 8723 (1957).

Blajot et al., 743 O.G. 933, June 23, 1959.

Fieser et al., "Organic Chemistry" (Reinhold), pp. 624–626 (1956).

Karrer, "Organic Chemistry" (Elsevier), pp. 434, 445 (1950).

Noller, "Chem. of Org. Compounds," 2nd ed. (Saunders), pp. 440–1 (1957).

ALEX MAZEL, *Primary Examiner.*

IRVING MARCUS, H. H. LIDOFF, *Examiners.*

D. T. McCUTCHEN, *Assistant Examiner.*